(12) United States Patent
Minami

(10) Patent No.: US 7,391,607 B2
(45) Date of Patent: Jun. 24, 2008

(54) COMPOSITE STORAGE APPARATUS AND A CARD BOARD THEREOF

(75) Inventor: Akira Minami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 10/749,068

(22) Filed: Dec. 29, 2003

(65) Prior Publication Data

US 2004/0151040 A1 Aug. 5, 2004

(30) Foreign Application Priority Data

Jan. 31, 2003 (JP) ............... 2003-023617

(51) Int. Cl.
  H05K 5/00 (2006.01)
  H05K 7/00 (2006.01)
  G01F 1/16 (2006.01)
(52) U.S. Cl. .................. 361/685; 361/686
(58) Field of Classification Search ........... 361/752, 361/685, 686; 365/200; 174/255
  See application file for complete search history.

(56) References Cited

U.S. PATENT DOCUMENTS

| | | | | |
|---|---|---|---|---|
| 5,422,441 | A * | 6/1995 | Iruka ................ | 174/250 |
| 6,199,122 | B1 * | 3/2001 | Kobayashi ........... | 710/36 |
| 6,567,273 | B1 | 5/2003 | Liu et al. ........... | 361/737 |
| 6,692,818 | B2 * | 2/2004 | Hirano et al. ........ | 428/209 |
| 2004/0052045 | A1 * | 3/2004 | Botchek ............. | 361/685 |
| 2004/0223310 | A1 * | 11/2004 | Toyomura ........... | 361/777 |

FOREIGN PATENT DOCUMENTS

| | | |
|---|---|---|
| DE | 202 07 720 U1 | 5/2002 |
| JP | 7-302140 | 11/1995 |
| JP | 8-202502 | 8/1996 |
| JP | 10-091564 | 4/1998 |
| JP | 10-289518 | 10/1998 |
| JP | 2000-358207 | 12/2000 |
| JP | 2001-022899 | 1/2001 |
| JP | 2001-109700 | 4/2001 |
| JP | 2001-195151 | 7/2001 |
| JP | 2002-062990 | 2/2002 |
| JP | 2002-073522 | 3/2002 |
| JP | 2002-082777 | 3/2002 |
| JP | 2002-288964 | 10/2002 |
| JP | 2002-297323 | 10/2002 |
| WO | WO 02/05102 A1 | 1/2002 |
| WO | WO 02/41154 A2 | 5/2002 |

OTHER PUBLICATIONS

Machine translation for JP 2002-288964, (Ryoichi) dated May 21, 2007.*

* cited by examiner

Primary Examiner—Hung V. Ngo
(74) Attorney, Agent, or Firm—Greer, Burns & Crain, Ltd

(57) ABSTRACT

A composite storage apparatus has a memory card and a storage device. An interface conversion circuit of a second interface and a first interface, a connector of the first interface, and memory card device are disposed on a card board. Thereby, a composite storage apparatus which has the memory card and a storage device with a single interface with a plurality of interfaces can be easily implemented.

21 Claims, 14 Drawing Sheets

COMPOSITE STORAGE APPARATUS AND A CARD BOARD THEREOF

CROSS-REFERENCE TO RELATED APPLICATIONS

This application is based upon and claims the benefit of priority from the prior Japanese Patent Application No. 2003-023617, filed on Jan. 31, 2003, the entire contents of which are incorporated herein by reference.

BACKGROUND OF THE INVENTION

1. Field of the Invention

The present invention relates to a composite storage apparatus where a plurality of different types of storage devices are mounted, and a card board thereof, and more particularly to a composite storage apparatus where a disk drive and a memory card are mounted, and a card board thereof.

2. Description of the Related Art

A disk drive using such storage medium as a magnetic disk, magneto-optical disk and optical disk can store large capacity, but are relatively large in size. A memory card using a semiconductor memory, on the other hand, is relatively small in size, but has a small storage capacity, so it is suitable for compact equipment.

Along with the recent advancements in digital processing technology, such portable equipment as digital cameras and digital video cameras are spreading, and for such portable equipment, memory cards, including a compact flash (CF) card, memory stick (MS) card (trade mark), smart media (SM) card, secure digital (SD) card, and multi-media card (MMC) are used.

A preferable type of usage is to edit the stored content of such a memory card by a personal computer, storing the result in a large capacity disk drive, and to use the memory card again. For this, a composite storage apparatus where a memory card reader/writer and a disk drive (MO drive) are integrated into one device unit has been proposed (e.g. Japanese Patent Application Laid-Open No. 2000-358207).

As a specific configuration of the composite storage apparatus, a memory card connector and a memory card controller are mounted on the board of the disk drive, and the interface with the host is limited to one type (e.g. Japanese Patent Application Laid-Open No. 2002-288964, and Japanese Patent Application Laid-Open No. 2001-022899).

In other words, in prior art, the interface of the memory card and the disk drive is one type (e.g. ATA (AT Attached)/ATAPI (AT Attached Packet Interface) or USB (Universal Serial Bus)), so one type of host interface is supported.

However in general purpose personal computers, various interfaces (such a serial interface as USB, and parallel interface as ATA/ATAPI) exist, and in memory cards as well, various interfaces (such a parallel interface as a CF card and serial interface as MS/SM/SD/MMC) exist.

In prior art, it is difficult for one composite storage apparatus with a memory card and disk drive to support such various interfaces. Constructing a composite storage apparatus using a disk drive and a memory card in which a plurality of interfaces are mounted respectively increases cost, because it is necessary to redesign and reproduce a disk drive and memory card which have a single interface for this purpose.

Also the size of the composite storage apparatus must be larger, which makes it difficult to contain in a 1 inch height (3.5 type storage form factor), and therefore makes it difficult to build this composite storage apparatus into a personal computer, digital camera and DVD recorder.

SUMMARY OF THE INVENTION

With the foregoing in view, it is an object of the present invention to provide a composite storage apparatus for supporting a plurality of host interfaces even if a memory card with a single interface and a disk drive are combined, and a memory card board thereof.

It is another object of the present invention to provide a composite storage apparatus for downsizing the apparatus and supporting a plurality of host interfaces even if a memory card and a disk drive are combined, and a memory card board thereof.

It is still another object of the present invention to provide a composite storage apparatus for downsizing the apparatus and supporting a plurality of host interfaces even if a memory card having a plurality of interfaces and a disk drive are combined, and a memory card board thereof.

To achieve these objects, a composite storage apparatus which has a memory card device and a storage device according to the present invention, has a storage device which has a first interface and a card board which has first and second interfaces. And the card board further has an interface conversion circuit for converting the second interface into the first interface, a connector which is connected to the interface conversion circuit, and the memory card device which is connected to the interface circuit and the connector.

The card board which has the first and second interfaces according to the present invention further has an interface conversion circuit for converting the second interface into the first interface, a connector which is connected to the interface conversion circuit for connecting with the outside using the first interface, and the memory card device which is connected to the interface circuit and the connector.

In the present invention, the interface conversion circuit between the second interface and the first interface, the connector for the first interface and the memory card device are disposed on the card board, so a composite storage apparatus which supports a memory card which has a single interface and a storage device with a plurality of interfaces can be easily implemented. Also the card board has a plurality of interface functions, so the same card board is used even if the storage apparatus is used with one interface, therefore a decrease in cost due to mass production can be expected. Also by changing the card board, a composite storage apparatus which has a single interface can be changed to a composite storage apparatus which has a plurality of interfaces.

In the composite storage apparatus or card board of the present invention, it is preferable that the memory card device further has a connector for a memory card, and a memory card control circuit which is connected to the connector and controls at least one of read and write of the memory card. By this, a composite storage apparatus which supports a plurality of interfaces can be easily implemented.

In the composite storage apparatus or card board of the present invention, it is preferable that the connector of the memory card comprises a plurality of connectors which support different types of memory cards, and the memory card control circuit comprises a memory card control circuit for controlling at least one of read and write of the respective different types of memory cards.

By this, the composite storage apparatus which supports a plurality of interfaces can be easily implemented to support multi-cards.

It is preferable that the composite storage apparatus or card board of the present invention further has a cable for connecting the connector of the card board and the connector of the storage device in the case of an external connection with the second interface. By this, communication with the outside using the second interface can be easily implemented.

It is preferable that the composite storage apparatus or card board of the present invention further has a cable for connecting the external equipment with the connector of the card board and the connector of the storage device in the case of an external connection with the first interface. By this, communication with the outside using the first interface can be easily implemented.

It is preferable that the composite storage apparatus or the card board of the present invention further has setup means for setting the master/slave between the memory card and the storage device disposed in the card board. By this, the master/slave between the memory card and the storage device can be easily implemented.

In the composite storage apparatus or the card board of the present invention, it is preferable that the card board mounts the memory card device and the interface conversion circuit on a single side. By this, a thin composite storage apparatus is implemented even when combined with storage device.

In the composite storage apparatus of the present invention, it is preferable that the removable storage device is comprised of a disk drive, so that a large capacity storage device can be used.

In the composite storage apparatus of the present invention, it is preferable that the disk drive has a disk drive mechanism and a drive board on which a circuit for controlling the disk drive mechanism is mounted, so connection with the card board can be easily implemented.

In the composite storage apparatus or the card board of the present invention, it is preferable that the first interface is a parallel interface and the second interface is a serial interface.

In the composite storage apparatus or the card board of the present invention, it is preferable that the first interface is an ATA/ATAPI interface and the second interface is a USB interface.

DESCRIPTION OF THE PREFERRED EMBODIMENTS

Embodiments of the present invention will now be described in the sequence of memory card board, disk drive, composite storage apparatus and other embodiments.

[Memory Card Board]

Figure 1:
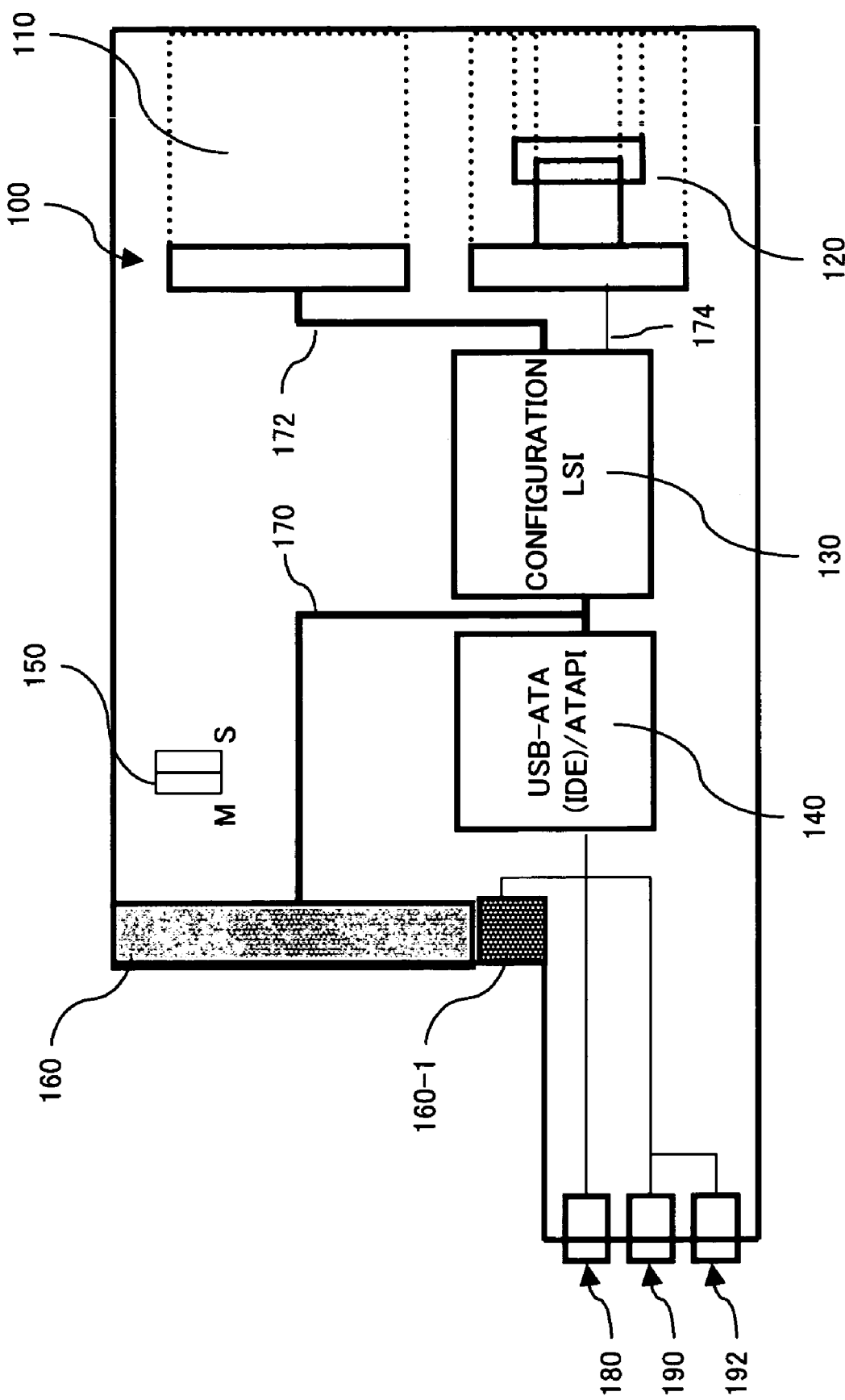
FIG. 1 is a diagram depicting a configuration of the card board according to an embodiment of the composite storage apparatus of the present invention.
Figure 2:
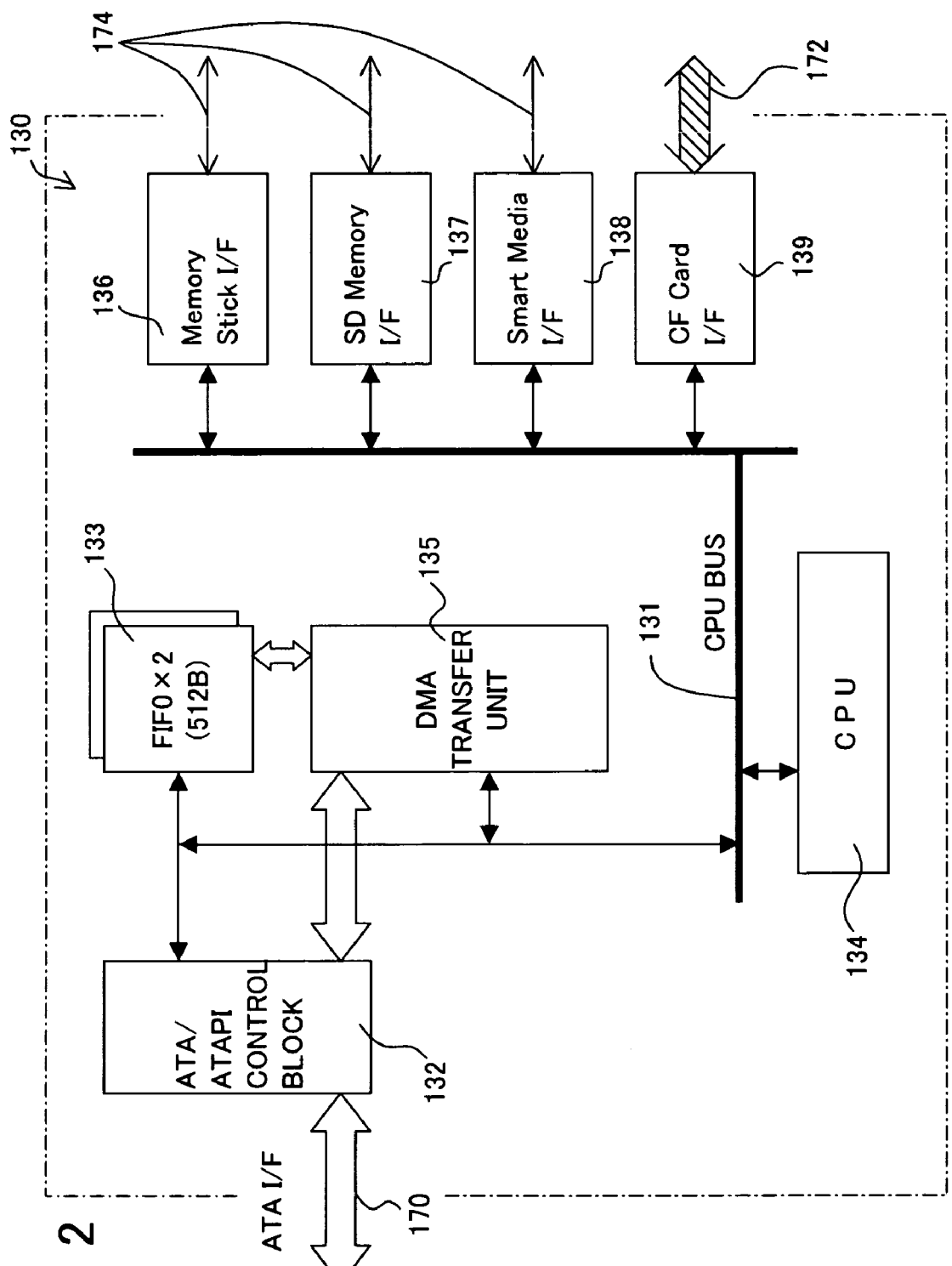
FIG. 2 is a block diagram depicting the configuration LSI in FIG. 1.
Figure 3:
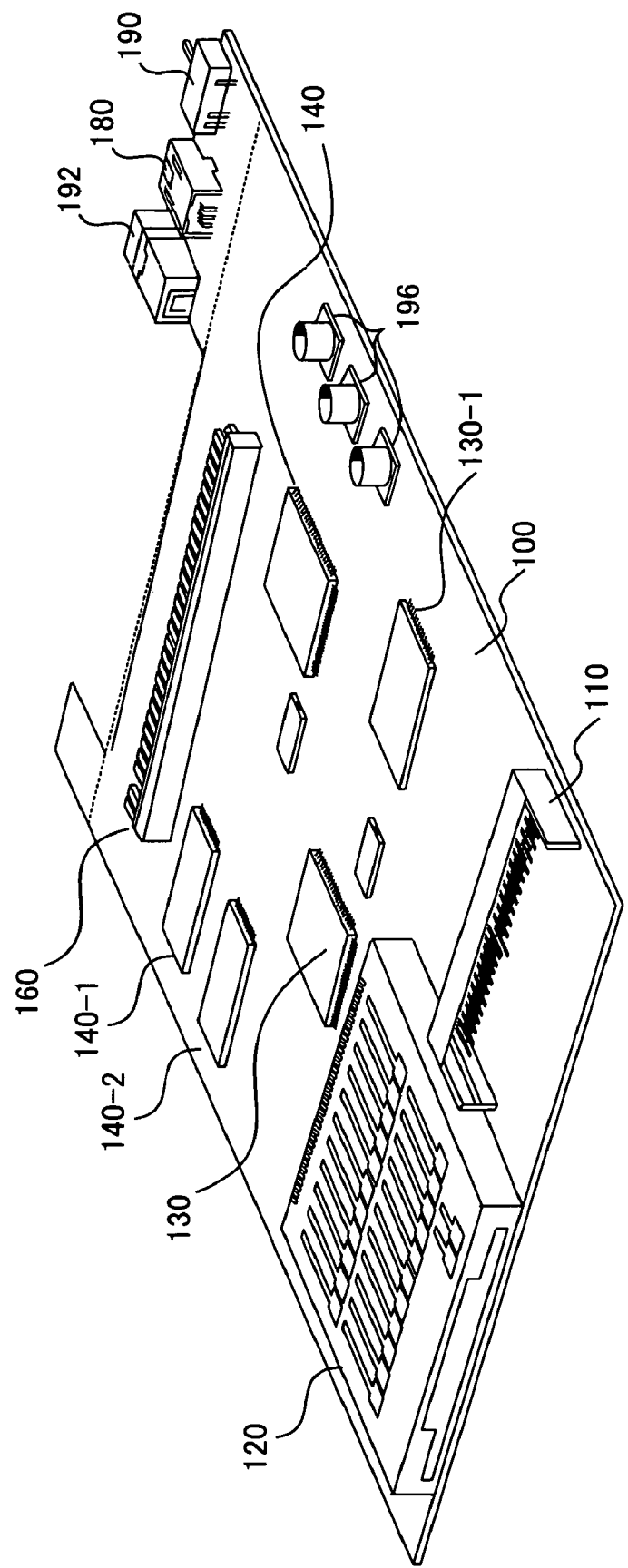
FIG. 3 is a perspective view depicting the card board in FIG. 1.

FIG. 1 is a top view of the memory card board of the composite storage apparatus according to an embodiment of the present invention, FIG. 2 is a diagram of a configuration LSI circuit thereof, and FIG. 3 is a perspective view thereof.

As FIG. 1 and FIG. 3 show, on the printed board 100, ATA/ATAPI connectors 160 and 160-1 for connecting the personal computer (not illustrated) and the ATA/ATAPI cable (mentioned later), an LSI 130 for configuring the ATA/ATAPI interface, a short plug 150 for setting the master/slave between the configuration LSI 130 and the ATA/ATAPI connector 160, a CF connector 110 to be connected to the slot of the compact flash (CF) card, and a connector 120 which support four types of cards, that is a memory stick (MS), smart media (SM) card, secure digital (SD) card and multi-media card (MMC), are mounted.

Also on the printed board 100, a USB connector 180 for connecting with the USB serial line from the personal computer, a DC jack (5V) 192 for supplying DC voltage from the outside, a power supply switch 190, and USB-ATA/ATAPI conversion LSI 140 are mounted.

The USB-ATA/ATAPI conversion LSI 140 is connected to the ATA/ATAPI connector 160 and the configuration LSI 130 via the ATA (IDE)/ATAPI bus 170. The configuration LSI 130 is connected with the MS/SM/SD/MMC connector 120 via the serial line 174 of each memory card, and is connected to the CF connector 110 via the parallel bus (CF bus) 172.

The USB-ATA/ATAPI conversion LSI 140 is connected to the first memory 140-1 for storing the conversion protocol and the second memory 140-2 for temporarily storing data for serial-parallel conversion, as shown in FIG. 3, and performs USB-ATA conversion or USB/ATAPI conversion by the CPU included in the LSI 140.

The configuration LSI 130 is a bridge circuit for connecting a plurality of interfaces to one ATA interface, as shown in FIG. 2, and is comprised of the ATA/ATAPI control block 132 for performing ATA/ATAPI interface control with the IDE (ATA) bus 170 in FIG. 1, the FIFO memory 133 which constitutes the data buffer between the ATA/ATAPI interface and another interface, the CPU 134 for bridge control, and the DMA circuit 135 for performing DMA (Direct Memory Access) transfer of the data of the FIFO memory 133.

The configuration LSI 130 is further comprised of the memory stick interface circuit 136 for interfacing with the memory stick (MS), SD memory interface circuit 137 for interfacing between the SD memory card and the multi-media card, the SM interface circuit 138 for interfacing with the smart media card, and the CF card interface circuit 139 for interfacing with the CF card, on the CPU bus 131 of the CPU 134.

This configuration LSI 130 is a so called "ATA/ATAPI bridge circuit" for bridging between the ATA/ATAPI interface and the MS interface, SD memory interface, SM interface and CF card interface. This configuration LSI 130 is connected to the memory 130-1 for storing the programs and parameters of the CPU 134, as shown in FIG. 3.

Numeral '196' in FIG. 3 indicates a capacitor. The operation of this board 100 will now be described in brief. In the case of the ATA/ATAPI connection with a host controller, such as a host PC (Personal Computer), the host PC is connected to the ATA/ATAPI connector 160 on the printed board 100 with the ATA/ATAPI cable. From here, the host PC is connected to the configuration LSI 130, then to the respective memory card connectors 110 and 120. In the configuration LSI, the pin 150 for setting the master/slave of the ATA/ATAPI has been provided, by which master or slave is set and fixed. The specification to allow the setting of this terminal by a short plug can also be selected.

In the case of the USB connection with the host PC, the host PC is connected to the USB connector 180 on the printed board 100 with the USB cable. From here, the host PC is connected to the USB-ATA/ATAPI conversion LSI 140, then to the ATA/ATAPI connector 160 of which is the master side of ATA/ATAPI, and is connected to the external storage device (disk drive), which is mentioned later.

The slave side is connected to the configuration LSI 130, which makes access to various memory cards possible. The master/slave connection from the USB-ATA/ATAPI conversion LSI 140 can be reversed, and in this case the sequence of drive letters changes when viewed from the host PC side. In the configuration of the apparatus, the removable storage device which has the ATA/ATAPI interface is connected to the ATA/ATAPI connector 160 on the printed board 100 by a cable, and is connected to the host PC via the USB cable connected to the USB connector 180 on the printed board 100.

[Disk Drive]

Figure 4:
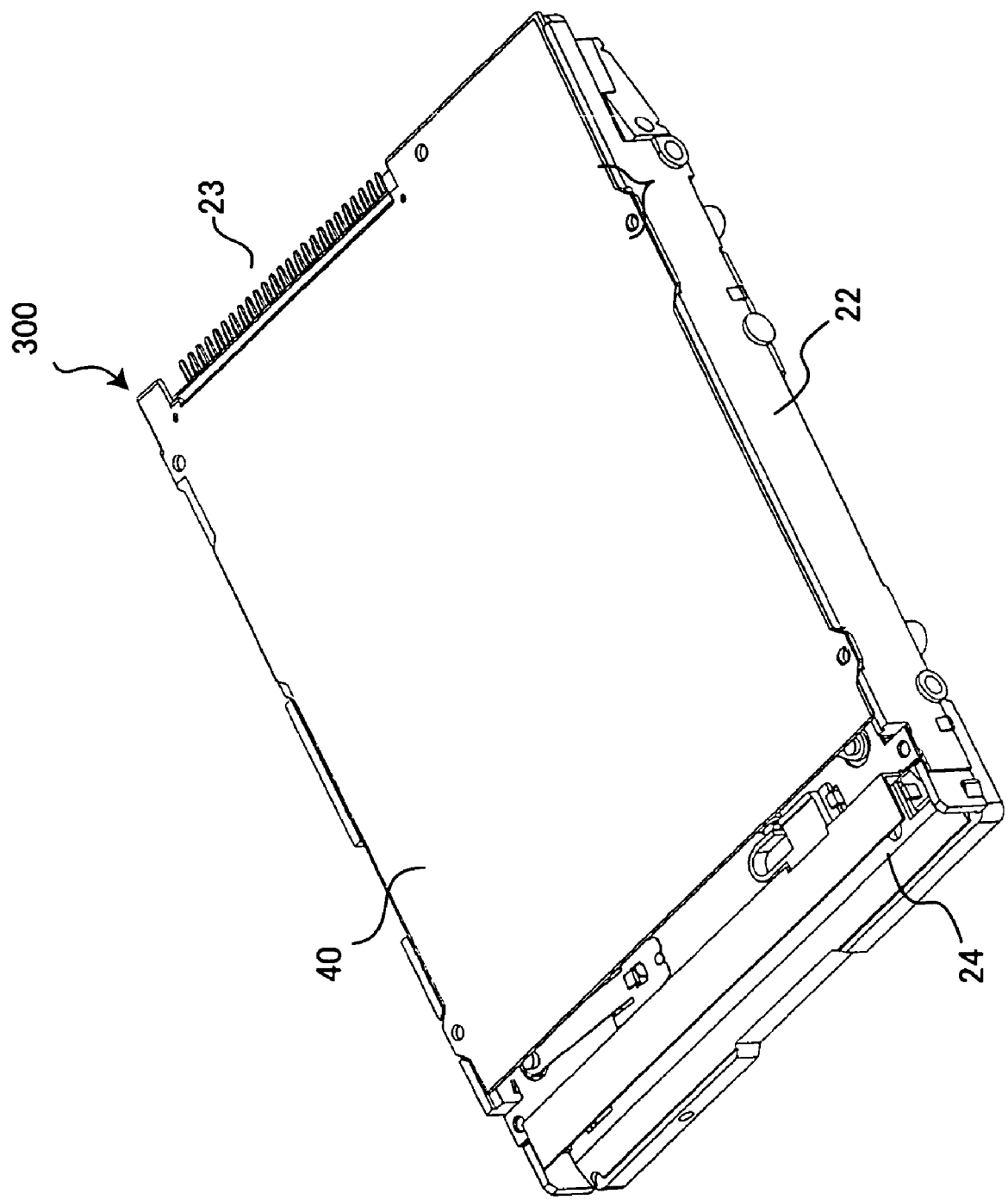
FIG. 4 is an external view depicting the storage device according to an embodiment of the composite storage apparatus of the present invention.
Figure 5:
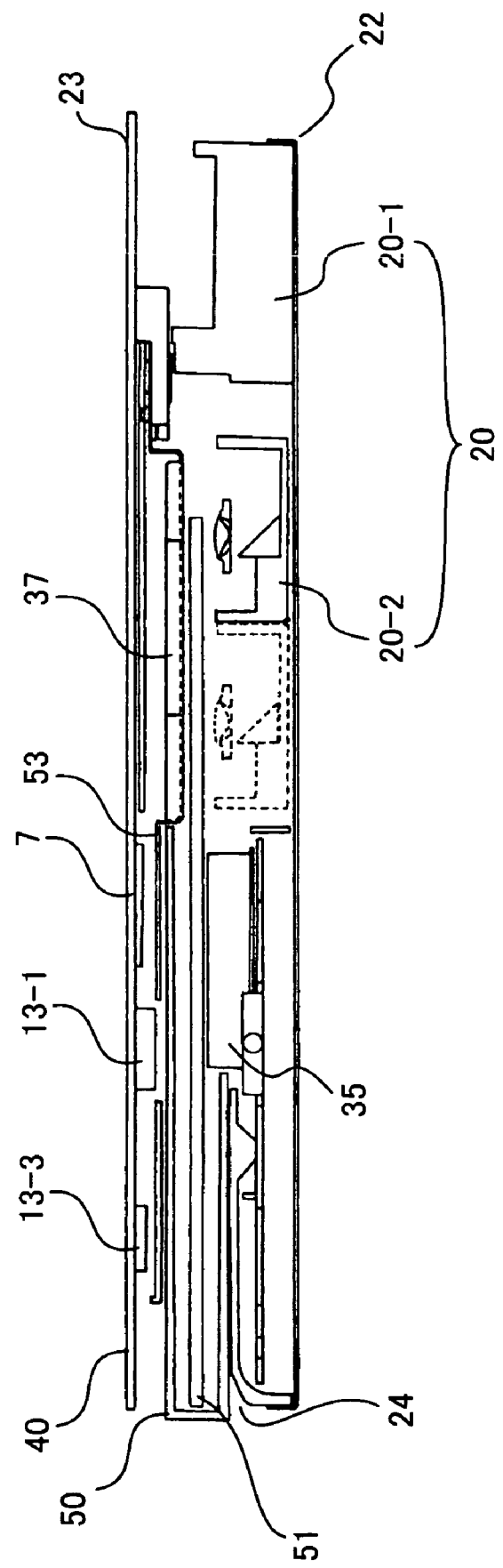
FIG. 5 is a cross-sectional view depicting the storage device in FIG. 4.
Figure 6:
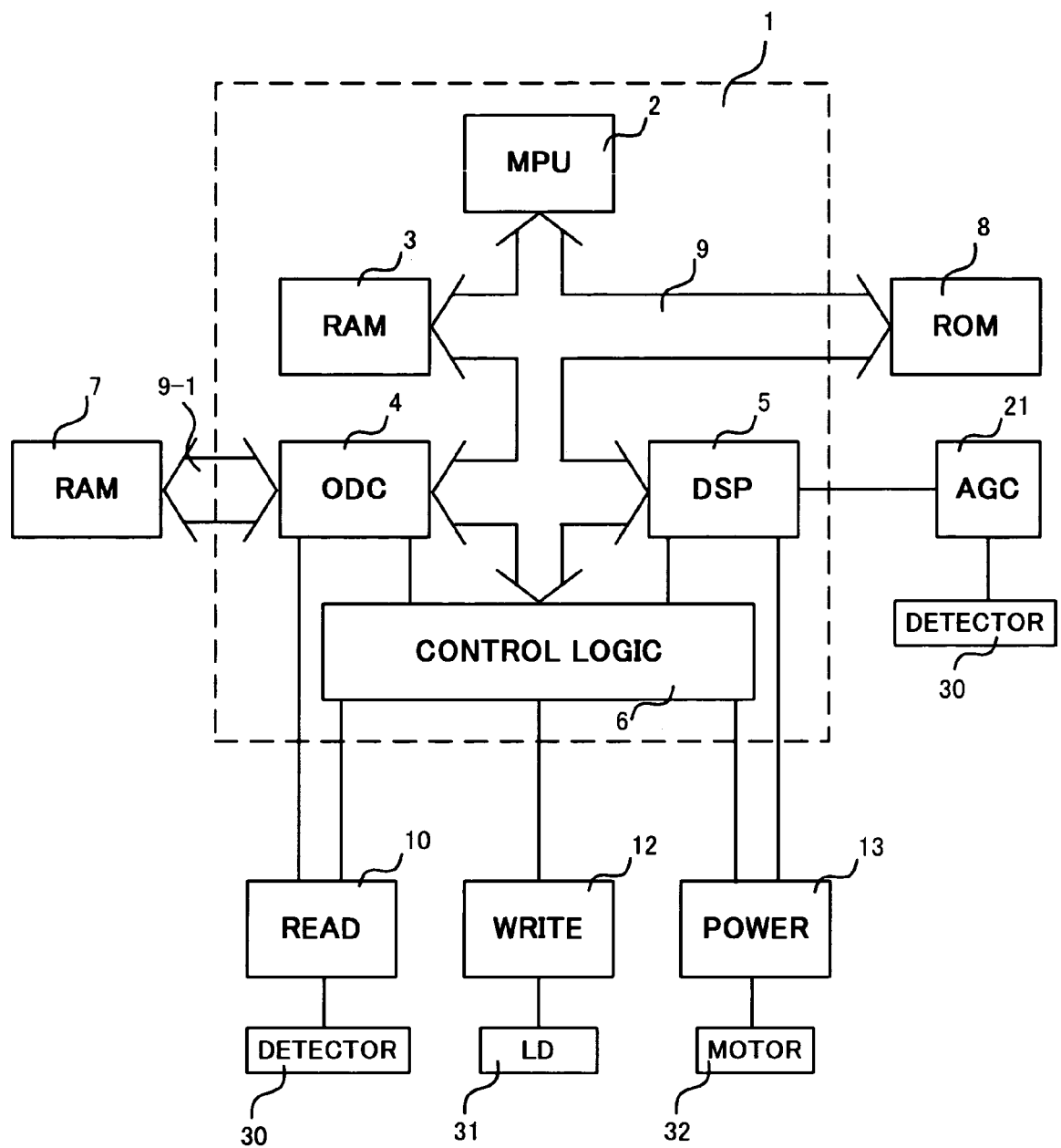
FIG. 6 is a block diagram depicting the control of the storage device in FIG. 4.
Figure 7:
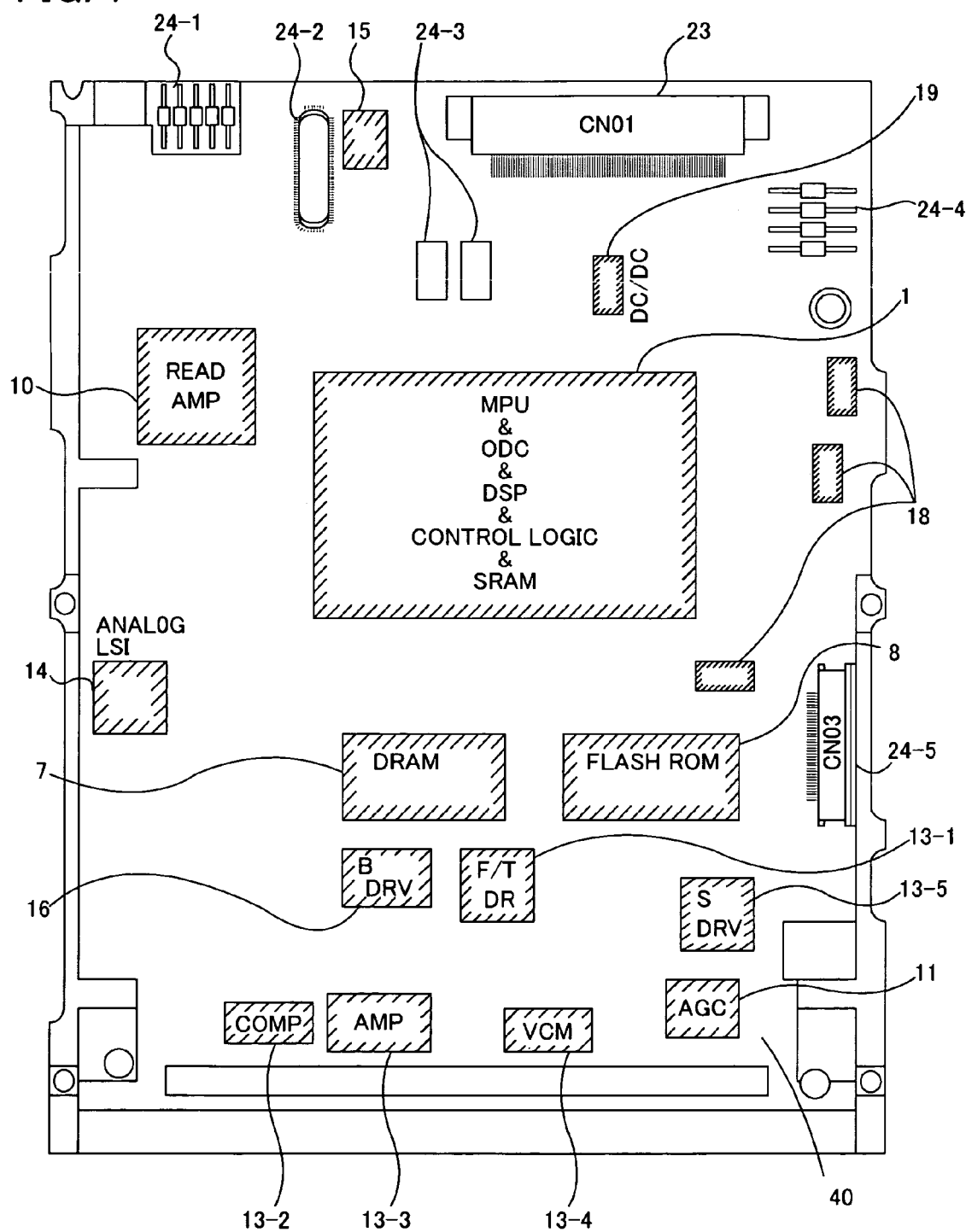
FIG. 7 is a diagram depicting the circuit layout on the printed board of the storage device in FIG. 5.

Now the disk drive of the composite storage apparatus will be described. FIG. 4 is an external view of the disk drive of the composite storage apparatus according to an embodiment of the present invention, FIG. 5 is a cross-sectional view of the device in FIG. 4, FIG. 6 is a circuit block diagram of the device in FIG. 4, and FIG. 7 is a circuit layout diagram of the printed board of the device in FIG. 4.

FIG. 4 to FIG. 7 show a magneto-optical disk device as a disk drive of the composite storage apparatus. As FIG. 4 shows, the magneto-optical disk drive 300 comprises a drive mechanism 22 which makes a slot 24 to which the magneto-optical disk is inserted, a printed board 40 which is disposed thereon and where the later mentioned control circuit is mounted, and a connector 23 disposed on the printed board 40.

On the front surface of the printed board 40 (surface seen in FIG. 4), circuit components are not mounted, and all the circuit components are mounted on the rear surface. In other words, a thin drive is implemented by single side mounting.

The control circuit to be mounted on the rear surface of the printed board 40 will be described with reference to FIG. 6. As FIG. 6 shows, the microprocessor (MPU) 2 is for performing the main control of the device. The random access memory (RAM) 3 is a memory used for the MPU 2 to perform arithmetic processing.

The optical disk controller (ODC) 4 is for performing interface control with the host and encoding/decoding data. The digital signal processor (DSP) 5 is for performing servo control for the optical head, etc. of the optical disk drive. The control logic circuit 6 is a logic circuit group for creating the timing gate for data transmission/reception between the MPU 2, ODC 4 and DSP 5, and the optical head and drive mechanism.

The MPU 2, RAM 3, ODC 4, DSP 5 and control logic circuit 6 are connected with an internal address/data bus line 9. The MPU 2, RAM 3, ODC 4, DSP 5, control logic circuit 6 and internal address/data bus line 9 are created on one chip, and constitute the control LSI 1.

The read only memory (ROM) 8 is a memory for the MPU 2 to store the control program to be executed. The ROM 8 is connected to the internal bus 9 of the control LSI 1. The random access memory (RAM) 7 is a memory used as a buffer memory of the read data and write data. The RAM 7 is connected with the ODC 4 via the external address/data bus line 9-1.

In addition to this digital circuit, an analog circuit is disposed. The analog circuit includes a read circuit 10, write circuit 12, drive circuit 13, and servo/AGC circuit 21.

The read circuit 10 amplifies the output of the optical detector 30 of the optical head, and outputs the read data to the ODC 4. The write circuit 12 drives the laser diode 31 of the optical head according to the write data, from the ODC 4. By this, data is written to the magneto-optical disk.

The drive circuit 13 drives the drive mechanism 32 of the optical head according to the servo signal from the DSP 5. The drive mechanism 32 of the optical head includes the focus actuator of the optical head, track actuator of the optical head, and the moving motor of the optical head.

The servo/AGC circuit 21 creates the focus error signal and the track error signal from the detection output of the optical detector 30 of the optical head. The focus error signal and the track error signal are output to the DSP 5.

In this way, the MPU 2, RAM 3, ODC 4, DSP 5, control logic circuit 6, and internal address/data bus line 9 are integrated in the control LSI 1. This decreases the area to house these circuits, so major downsizing of these circuits is possible.

Since the internal address/data bus line 9 is disposed in the LSI 1, the length of the address/data bus line disposed outside the LSI 1 can be shorter. By this, the area occupied by the address/data bus line on the circuit board can be decreased.

The digital circuit for inputting/outputting digital signals and the bus line 9 are integrated, so the radiation of noise to the external analog circuit can be prevented. This makes servo control accurate and the read operation stable.

The DSP 5, including the A/D and D/A converters, is a digital/analog mixed circuit. However the DSP 5, which is connected to the bus line, is also integrated. This makes the device even smaller, and the radiation of noise can also be decreased.

Here the ROM 8 and the RAM 7 may be integrated into the control LSI 1. In the present embodiment, however, the RAM 7 plays a role of a data buffer, so the external bus 9-1 for connecting with the ODC 4 is different from the internal address/data bus line 9. Also the requirement of changing the buffer size must be considered. Therefore the RAM 7 is not integrated into the control LSI 1.

The ROM 8 stores the control programs. For this, it is more convenient if the control programs be written in the ROM 8 alone. Also for upgrading the versions of control programs, the control programs may be rewritten. In this case as well, it is more convenient if the control programs be written in the ROM 8 alone. Therefore the ROM 8 is not integrated in the control LSI 1.

Needless to say, the ROM 8 and/or the RAM 7 can be integrated in the LSI 1. This makes further downsizing possible.

The optical disk drive mechanism 22 will be described with reference to the cross-sectional view in FIG. 5. The drive mechanism 22 is comprised of the spindle motor 35 and the optical head 20. The spindle motor 35 is for rotating the optical disk 51 in the cartridge case 50 which is inserted through the slot 24.

The optical head has a fixed section 20-1 and a movable section 20-2. In the fixed section 20-1, the laser diode 31 and the optical detector are disposed, and are fixed to the device base.

The movable section 20-2 is moved by the voice coil motor in the direction crossing the tracks of the optical disk 51. In the movable section 20-2, an object lens, focus actuator, track actuator and lens position detector are disposed.

On this fixed section 20-1, the cartridge holder 53 is installed. The cartridge holder 53 is for holding the cartridge case 50 to be inserted. At the center of the top face of the cartridge holder 53, a coil for applying the bias magnetic field 37 is disposed.

The magneto-optical disk device will be described in more details with reference to the circuit layout diagram on the printed board 40 in FIG. 7. As FIG. 7 shows, the control LSI 1 is comprised of the MPU 2, ODC 4, DSP 5, control logic circuit 6 and SRAM 3, which are integrated into one chip, as shown in FIG. 6.

To this one chip LSI 1, three clock supplies (crystal oscillators) 18 are connected. The clock supplies 18 are a clock supply for generating the system clock, a clock supply for generating the reference clock for medium type 1 (for 230M/128M medium), and a clock supply for generating the reference clock for medium type 2 (for 640M/540M medium). The RAM 7 is comprised of a general purpose 4-mega DRAM. The ROM 8 is comprised of 4-mega flash ROMs.

In the fixed section 20-1 of the optical head 20 in FIG. 5, the write LSI circuit 12 and the preamplifier/servo AGC circuit 21 shown in FIG. 6 are disposed. The write LSI circuit 12 performs read/write light emission control of the laser diode (light emitting element) of the fixed section 20-1. The write LSI circuit 12 is connected to the control logic circuit 6 of the control LSI 1, and performs read/write light emission control of the laser diode 31 according to the instructions of the MPU 1.

The preamplifier/servo AGC circuit 21 is for converting the detected current of the optical detector 30 into voltage, then creating regeneration signals, focus error signals and track error signals. The preamplifier/servo AGC circuit 21 is comprised of a regeneration signal creation circuit, focus error signal creation circuit and track error signal creation circuit.

The read circuit (LSI) 10 generates the waveforms of the regeneration signal (read signal) of the preamplifier/AGC circuit 21, and outputs the pulsed read data to the ODC 4. The read LSI 10 is comprised of a waveform generation circuit.

The analog LSI circuit 14, comprised of various analog circuits, which are integrated, is used in the device. The analog LSI circuit 14 performs the filtering of the focus error signals and the track error signals, and amplification.

In the optical disk drive mechanism 22 in FIG. 5, a lens position detection circuit for detecting the objective lens position of the optical head 20 is disposed. The AGC amplifier 11 is a circuit for converting the current/voltage of the sensor signal of the detection circuit 33.

The focus actuator of the optical disk drive mechanism 22 drives the objective lens of the optical head 20 in the focus direction to adjust the focus position of the optical beam. The track actuator drives the objective lens of the optical head 20 in the direction crossing the tracks to adjust the track position of the optical beam. The voice coil motor moves the optical head 20 to the direction crossing the tracks of the optical disk.

In FIG. 7, the DSP 5 performs various servo control processing according to the focus error signals and the track error signals from the analog LSI circuit 14, and the lens position detection signals from the AGC amplifier 11. In other words, the DSP 5 performs focus servo control, track servo control and seek control.

The DSP 5 has an A/D converter group for converting analog/digital for the focus error signals, track error signals and lens position detection signals. And the DSP 5 computes the servo control values (focus servo control value, track servo control value, seek servo control value) based on these signals converted into digital.

The DSP 5 has a D/A converter group for converting each servo control value into an analog servo control amount. The DSP 5 outputs the control amount to the drive circuits 13-1 and 13-4 for servo control.

This drive circuit 13-1 is a focus/track driver circuit for driving the focus actuator and track actuator. The focus/track driver circuit is comprised of known circuits. In other words, the focus/track driver circuit is comprised of an independent 2-channel H type bridge circuit IC.

To this focus/track driver circuit 13-1, an Operation-amp 13-3 for detecting the drive current and a comparator 13-2 for setting the drive current value are connected. The drive circuit 13-4 is a VCM driver circuit for driving the voice coil motor. The VCM driver circuit 13-4 is comprised of a general purpose full bridge circuit.

The eject driver circuit 15 is connected to the control logic circuit 6, and drives the eject motor 36 of the drive mechanism 22 in FIG. 4 according to the instructions from the MPU 2. The spindle driver circuit 13-5 is connected to the control logic circuit 6 and drives the spindle motor 35 according to the instructions from the MPU 2. The spindle driver circuit 13-5 is comprised of a 3-phase sensor-less motor driver.

The bias driver circuit 16 is connected to the control logic circuit 6, and drives the bias coil 37 in FIG. 5 according to the instructions from the MPU 2. The bias driver circuit 16 is comprised of an H-type bridge circuit. The DC-DC converter 19 converts the 5 volt voltage into 3.3 volt voltage, and supplies the power.

For the operation of the control circuit, the DSP 5 converts the focus error signals and the track error signals of the analog LSI circuit 14 into digital signals, then performs focus servo control and track servo control according to these signals. In other words, the DSP 5 outputs the control amount to the focus/track drive circuit 13-1, and drives the focus actuator and the track actuator of the optical head 20.

The read/write instruction is sent from an external computer to the MPU 2 via the ODC 4. The MPU 2 instructs the moving distance to the DSP 5 so that the optical head is positioned at a specified track position of the optical disk. The DSP 5 drives the voice coil motor of the drive 22 via the VCM driver circuit 13-4. The DSP 5 drives the voice coil motor while detecting the position of the optical head using the track error signals of the analog LSI circuit 14, and positions the optical head to the specified track.

The write data received by the ODC 4 is stored in the DRAM 7, and then is output to the write LSI 12, and the laser diode 31 of the optical head 22 is driven. By this, the optical disk is written.

When the read instruction is received, the preamplifier/servo AGC circuit 21 creates the regeneration signal from the detection signal of the optical detector 30 of the optical head 20. The regeneration signal is pulsed by the read circuit 10, and read data is acquired. The read data is output from the read LSI 10 to the ODC 4, and is then stored in the DRAM 7. The read data stored in the DRAM 7 is output from the ODC 4 to the outside.

As FIG. 7 shows, the control LSI 1 is disposed at the center of the circuit board 40. Surrounding this control LSI 1, the ROM 8, RAM 7, analog LSI circuit 14 and read LSI circuit 10 are disposed. The AGC circuit 11, driver circuits 13-1, 13-4, 13-5 and 16, amplifier 13-3, and comparator 13-3 are disposed below these components.

On the opposite side of the circuit board 40 in FIG. 7, components are not mounted. Numeral '23' is an ATA, that is, the IDE (Integrated Device Electronic) interface connector, and numerals '24-1' and '24-5' are connectors for connecting with the optical disk drive.

Returning to FIG. 5, components are not mounted on the top face of the circuit board 40. All components are mounted on the bottom face of the circuit board 40. The circuit board 40 is installed in the optical disk drive 22 such that the bottom face faces the optical disk drive 22. Since no components are mounted on the top face of the circuit board 40 and the circuit board 40 where components are mounted on the bottom face is installed contacting the optical disk drive mechanism 22, the thickness of the optical disk drive, including the circuit board 40, can be further decreased. Therefore an optical disk drive with about a 17 mm thickness, for example, can be implemented.

[Composite Storage Apparatus]

Figure 8:
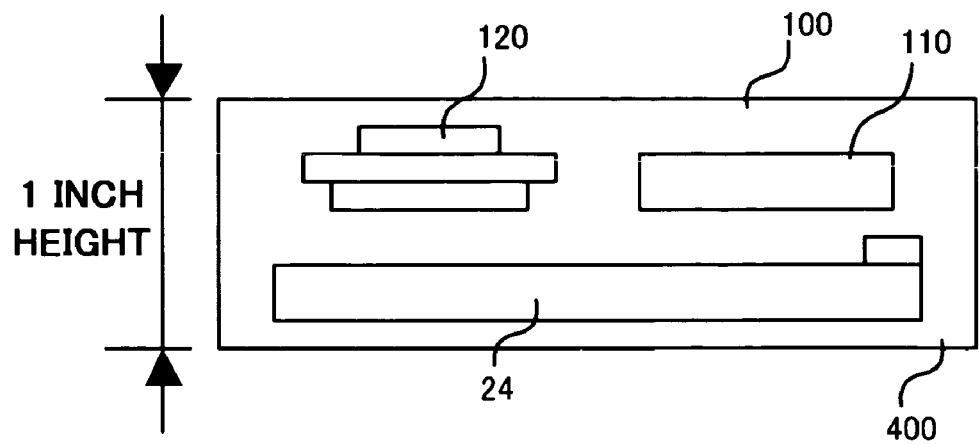
FIG. 8 is a front view depicting the composite storage apparatus according to an embodiment of the present invention.
Figure 9:
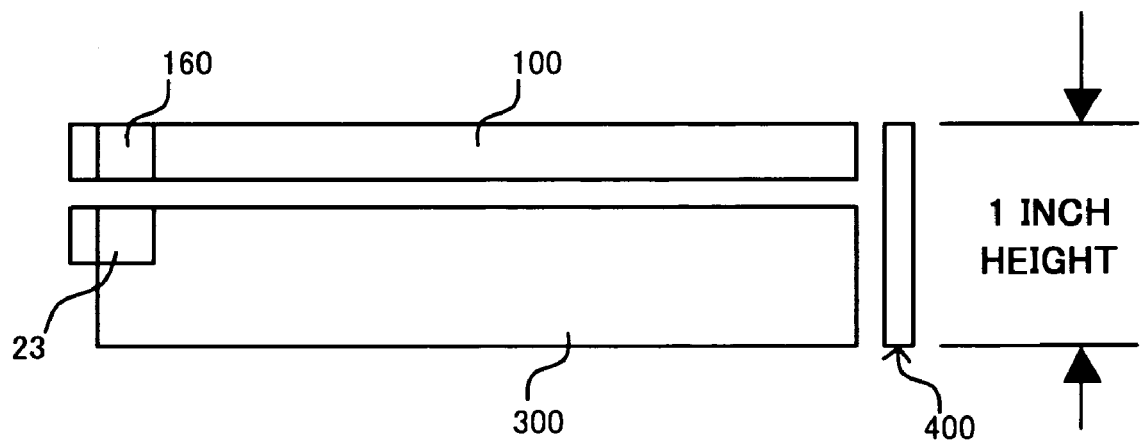
FIG. 9 is a cross-sectional view depicting the composite storage apparatus in FIG. 8.
Figure 10:
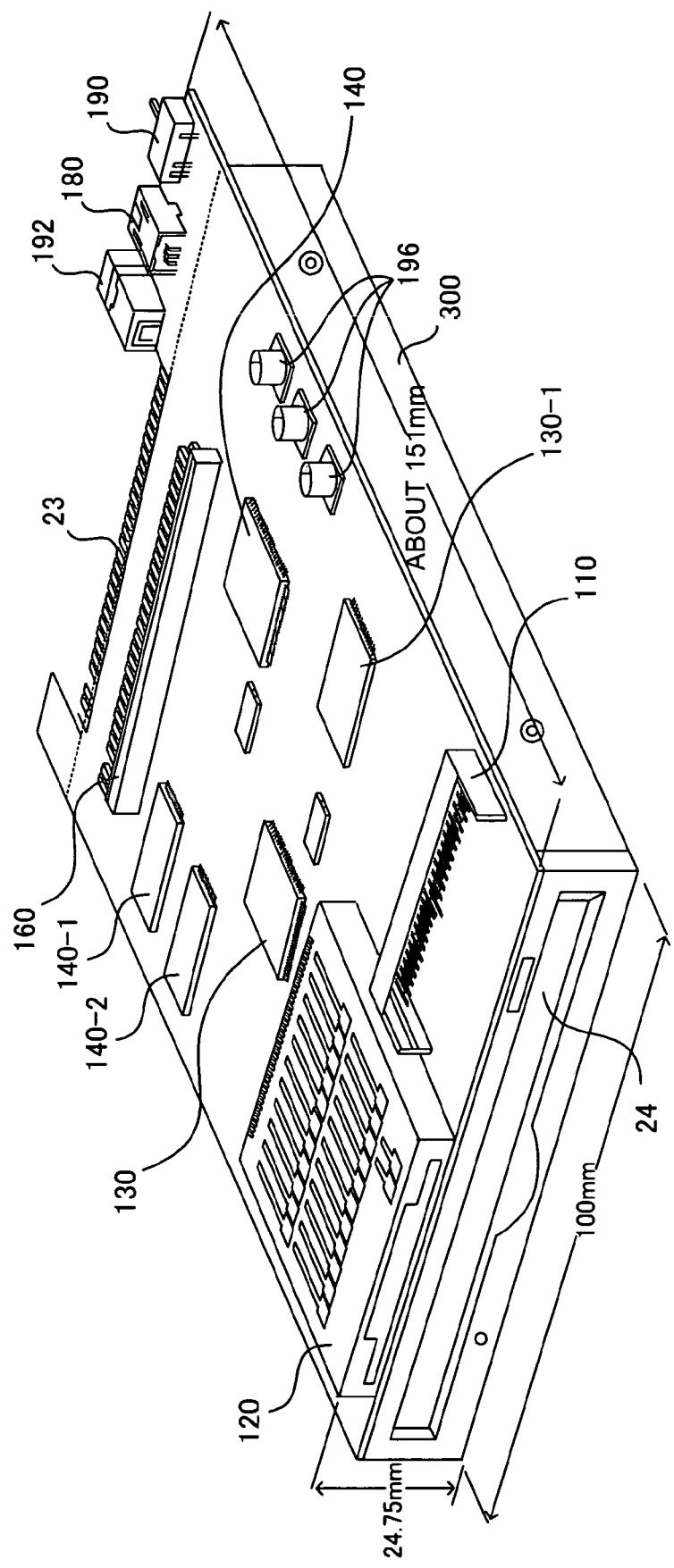
FIG. 10 is a perspective view depicting the composite storage apparatus in FIG. 9 viewed from the front side.
Figure 11:
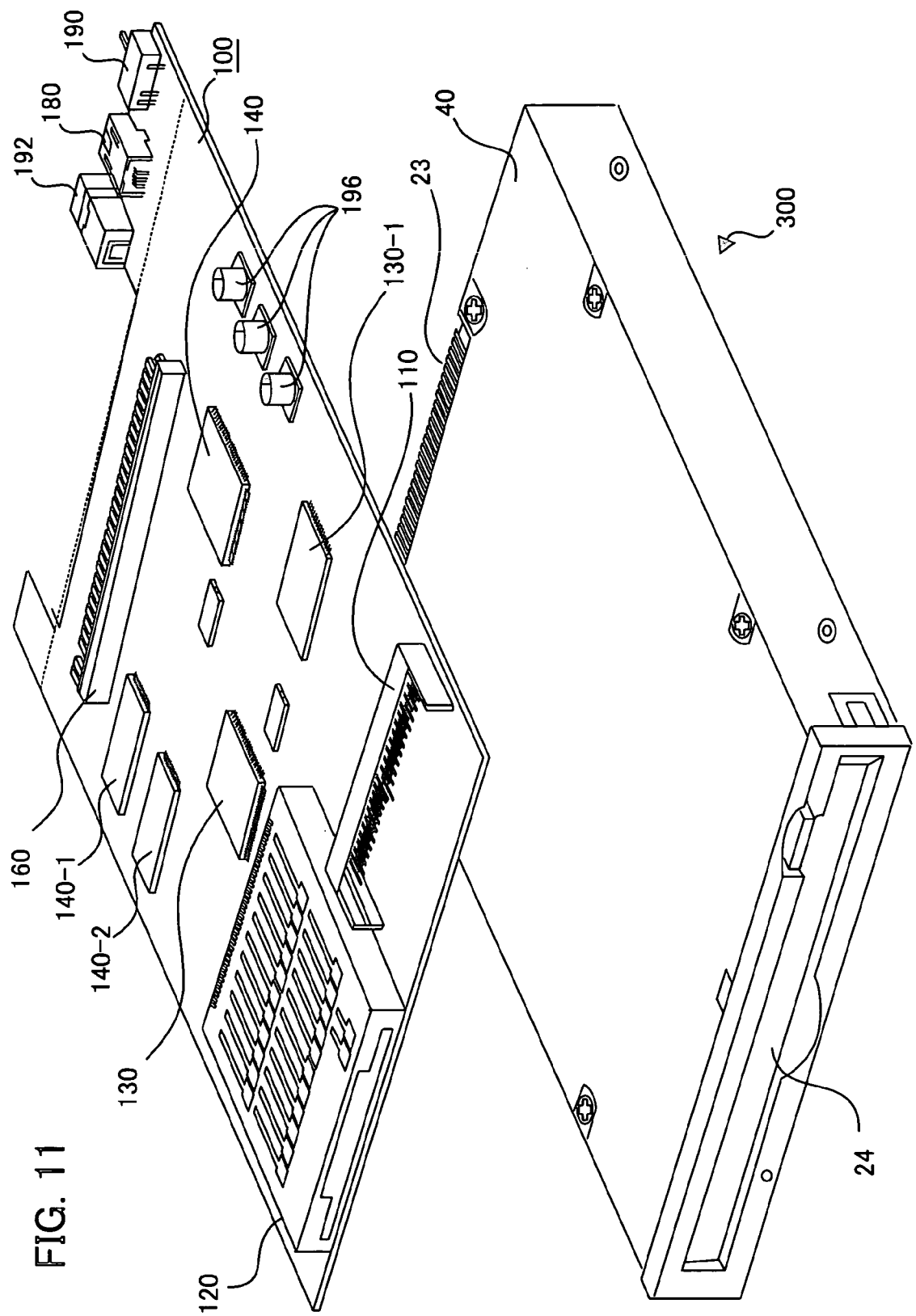
FIG. 11 is an exploded perspective view depicting the composite storage apparatus in FIG. 10.
Figure 12:
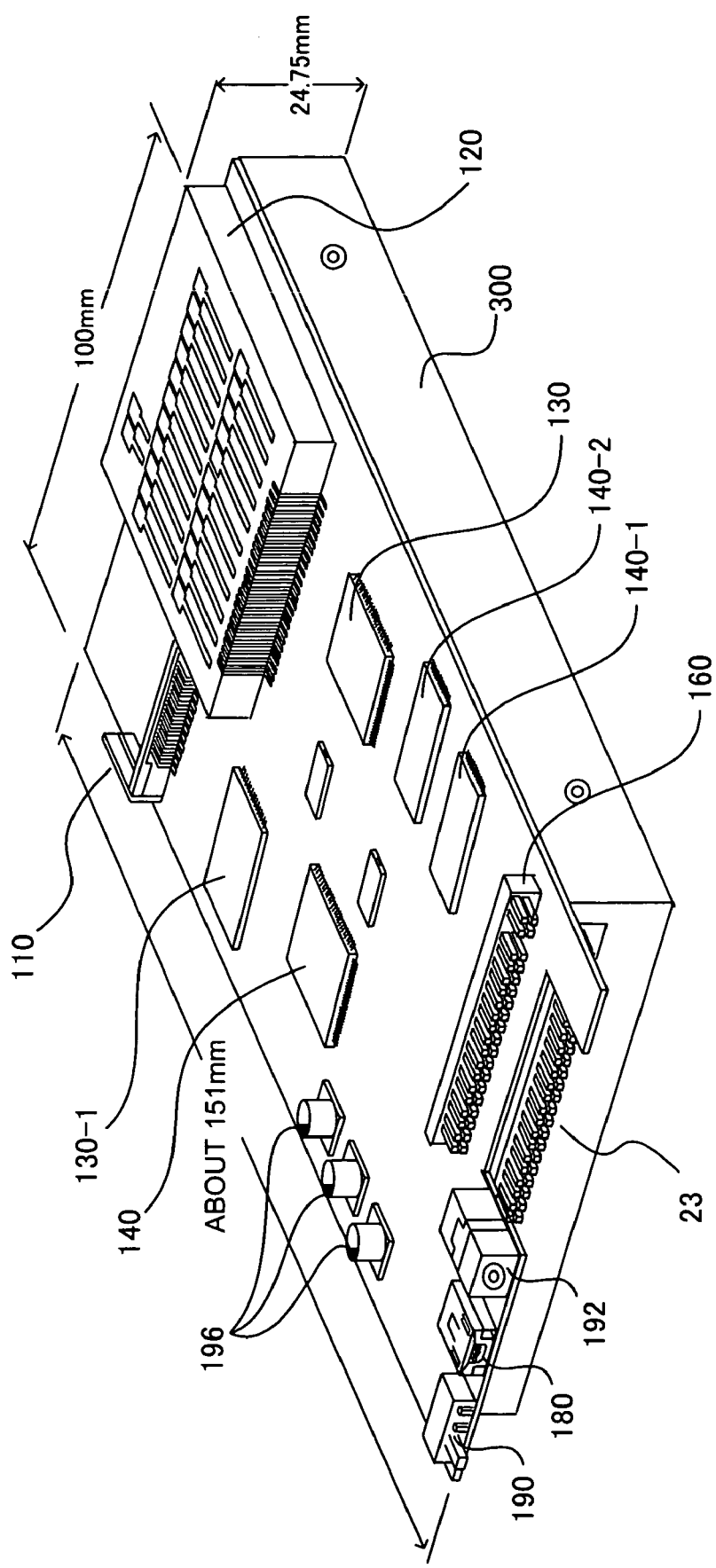
FIG. 12 is a perspective view depicting the composite storage apparatus in FIG. 9 viewed from the back side.

FIG. 8 is a front view depicting the composite storage apparatus according to an embodiment of the present invention, FIG. 9 is a cross-sectional view thereof, FIG. 10 is a perspective view viewed from the front side, FIG. 11 is an exploded perspective view thereof, and FIG. 12 is a perspective view viewed from the back side.

As FIG. 8 and FIG. 9 show, the print board 100 constructed as shown in FIG. 1 to FIG. 3 is placed on the thin type removable storage device 300 shown in FIG. 4 to FIG. 7 with the circuit mounting face up, and the panel 400 is disposed on the front face so as to be constructed as a composite type device. In the front panel in FIG. 8, both the slot 110 of the independent compact flash (CF) card and the connector 120 which supports four types of cards, that is a memory stick (MS), smart media (SM), secure digital (SD) card and multimedia card (MMC), are disposed. The connect-ability of various memory cards is based on the specifications of the configuration LSI 130.

The composite storage apparatus will now be described in more detail. FIG. 10 is a perspective view of the composite storage apparatus in FIG. 8 and FIG. 9 viewed from the front side, and FIG. 11 is an exploded perspective view thereof. FIG. 12 is a perspective view of the composite storage apparatus in FIG. 8 and FIG. 9 viewed from the back side.

By layering the single-side mounted card printed board 100 and the single-side mounted removable storage device 300, a 1 inch (=25.4 mm, 3.5 type storage form factor) or less thin composite storage apparatus can be implemented. The depth of the card printed board 100 can be set to a value which cannot exceed the depth of the storage device 300, even if these circuits are mounted, so not only the height of the composite storage apparatus but also the depth and width can be prevented from being large.

For this, an ATA/ATAPI interface, which can be connected internally, is used for a tower type PC, and the card printed board 100 can be mounted on both the removable storage device 300, such as an MO, and the reader/writer of the memory card at a 3.5 type form factor, and as a result, this composite storage apparatus can be built into a PC simply and compactly.

As an external type, using a serial interface, such as a USB interface, a product where the card printed board 100 is mounted for both the removable storage device 300 and the reader/writer of the memory card can be constructed with a compact appearance.

By making a printed board with an ATA/ATAPI interface and a printed board with a serial interface, such as a USB interface, to be common, a composite storage apparatus with a 3.5 type storage form factor can be easily implemented.

Contrary to this example, the card printed board 100 can be layered on the removable storage device 300 with the circuit mounting face down. However, if the card printed board 100 is layered on the removable storage apparatus 300 with the circuit mounting face up, as in this example, the master/slave setup pin 150 can be exposed on the surface (top face), which makes setting easy. By disposing a resist film or a film for short circuit prevention between the printed board 100 and the board 40 of the removable storage device 300, a contacted form can be implemented, which makes the device thinner. Also if the card printed board 100 is layered on the removable storage device 300 with the circuit mounting face up, distance can be taken between circuits, which decreases the noise between the circuits and decreases the influence of heat generation.

Figure 13:
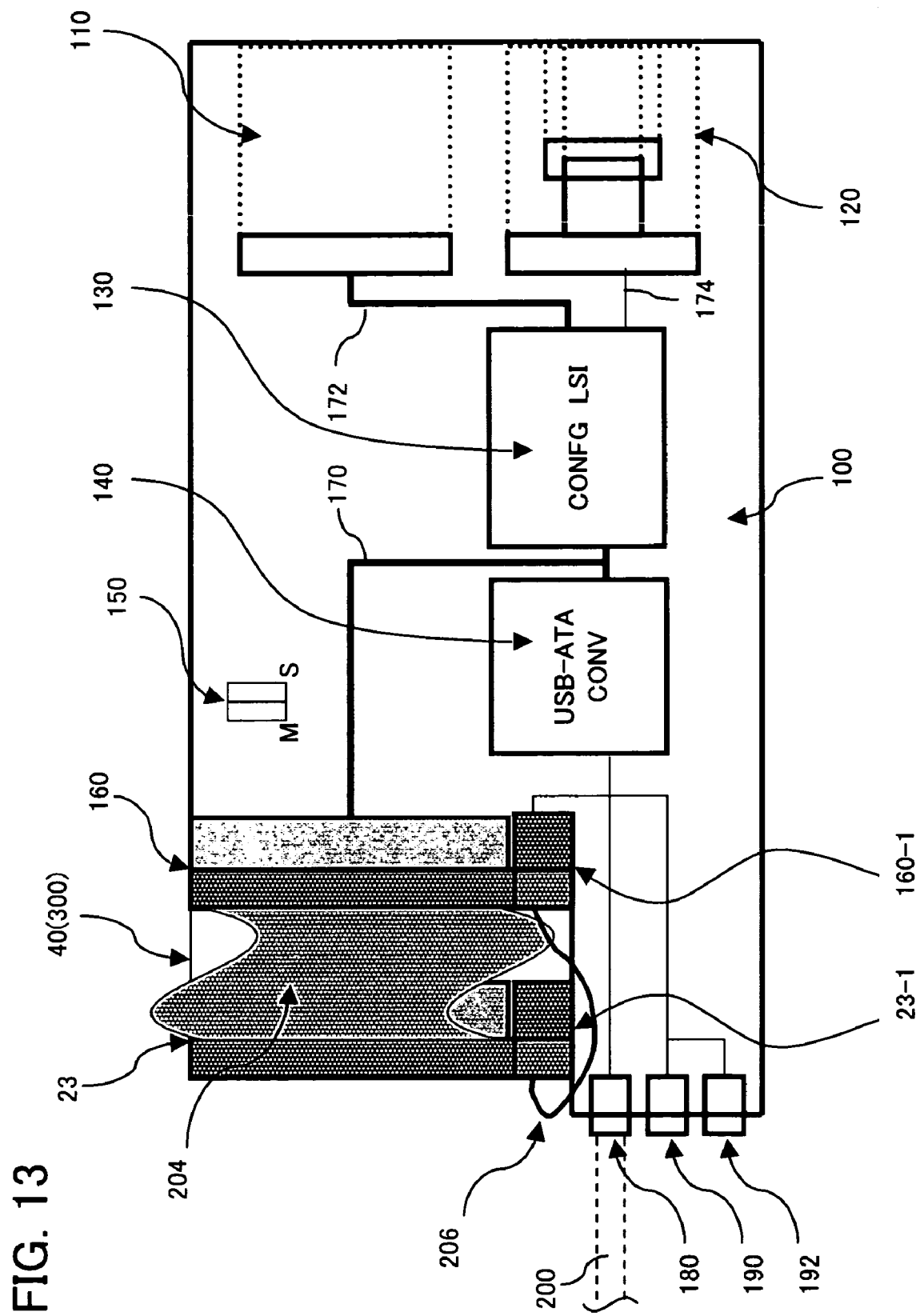
FIG. 13 is a diagram depicting the composite storage apparatus in FIG. 8 to FIG. 12 in the case of a USB interface connection.
Figure 14:
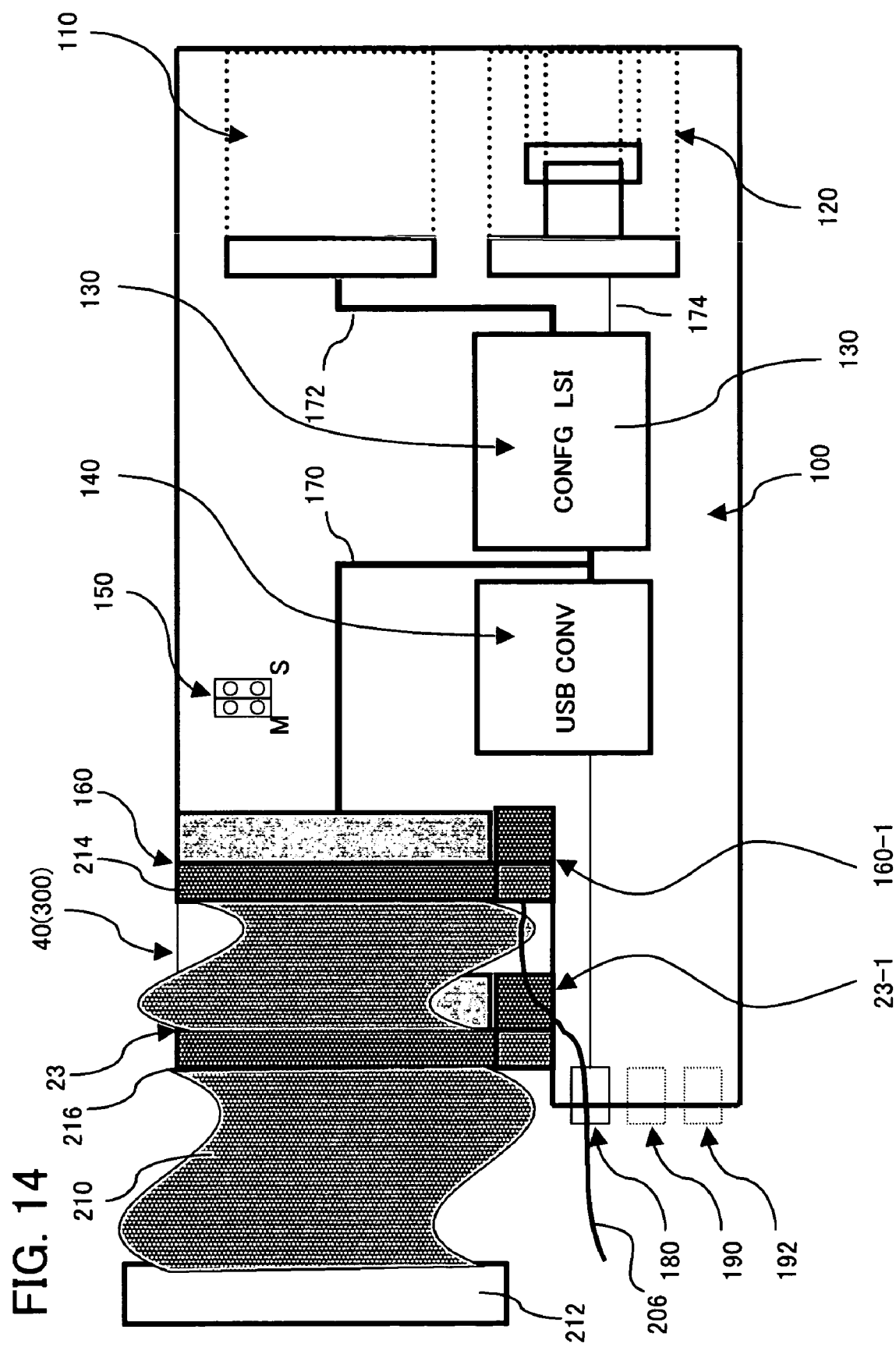
FIG. 14 is a diagram depicting the composite storage apparatus in FIG. 8 to FIG. 12 in the case of an ATA/ATAPI interface connection.

FIG. 13 is a diagram depicting an example of using the composite storage apparatus in FIG. 8 to FIG. 12 with a USB interface. The host PC is connected to the USB connector 180 on the card printed board 100 with the USB cable 200. From here, the host PC is connected to the USB-ATA/ATAPI conversion LSI 140, and the master side of the ATA/ATAPI side is connected to the ATA/ATAPI connector 160, and is connected to the ATA/ATAPI connector 23 of the storage device 300 via the ATA/ATAPI connector 204.

The slave side is connected to the configuration LSI 130, and is connected to the connectors 110 and 120 of various memory cards via the parallel bus 172 and the serial line 174. In this way, various memory cards can be accessed.

The connection of master/slave from the USB-ATA/ATAPI conversion LSI 140 can be reversed, and in this case, the sequence of drive letters change when viewed from the host PC. As a configuration of the apparatus, the removable storage device 300 which has the ATA/ATAPI interface is connected to the ATA/ATAPI connector 160 on the printed board 100 via the cable 204, and is connected to the host PC with the USB cable 200 connected to the USB connector 180 via the USB-ATA/ATAPI converter 140 on the printed board 100.

In the case of the ATA/ATAPI connection with the host. PC, the host PC is connected to the ATA/ATAPI connector 160 on the printed board 100 via the ATA/ATAPI cable 210 shown in FIG. 15. From here, the host PC is connected to the configuration LSI 130, and is connected to each memory card connector 110 and 120. The configuration LSI has a pin 150 for setting the master/slave of ATA/ATAPI, by which master or slave is set and fixed. The specification to allow the setting of this terminal by a short plug can also be selected.

Figure 15:
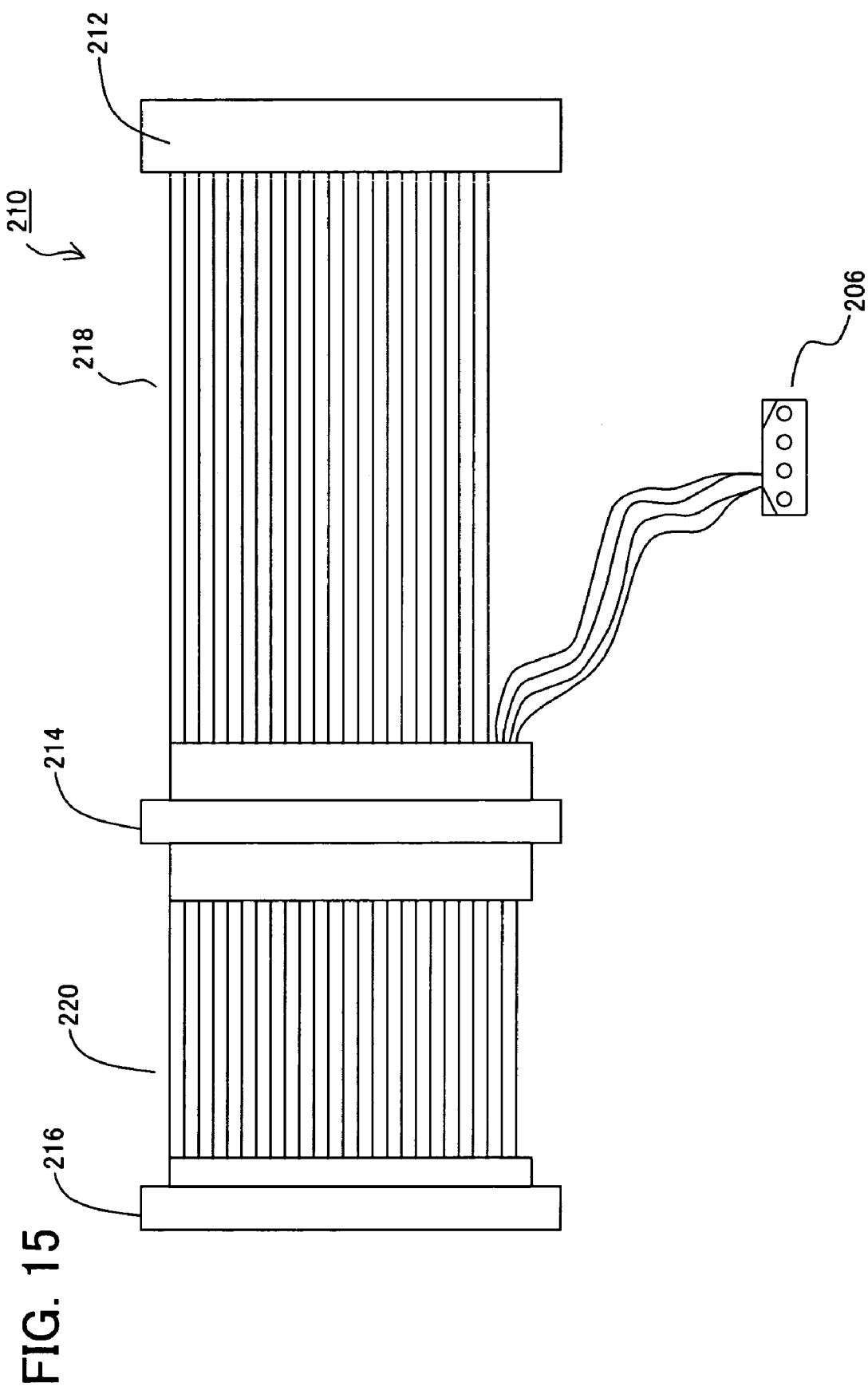
FIG. 15 is a diagram depicting the configuration of the connection cable in FIG. 14.

Then the host PC is connected to the connector 23 of the printed board 40 of the removable storage device 300 via the connector 216 of the ATA/ATAPI cable 210 shown in FIG. 15.

By constructing the memory card board (interface board) 100 as shown in FIG. 1 to FIG. 3, a composite type apparatus is implemented which can be commonly used as a composite type apparatus having an ATA/ATAPI interface and an apparatus having an interface that is determined based on the mounted LSI, such as the USB-ATA/ATAPI conversion LSI 140. Shared use is possible in both the printed board level and the completed apparatus level.

The ATA/ATAPI cable 210 in FIG. 15 is comprised of the host side connector 212, power supply connector 206, connection cable 218, connector for printed board 214, connection cable 220 and connector for storage equipment 216.

[Other Embodiments]

In the above embodiment, the storage device was described using the magneto-optical disk drive shown in FIG. 3, but a storage device with another configuration, such as a magnetic disk drive, optical disk drive, magneto-optical disk drive, or removable type optical disk drive, magneto-optical disk drive and magnetic disk drive can be used.

The interface was described using USB, ATA/ATAPI and memory card, but other interfaces, such as IEEE 1394 and SCSI can be applied, and the number of interfaces is not limited to two types but may be three or more. For the memory card, other format memory cards can be used.

The present invention was described by the embodiments, but the present invention can be modified in various ways within the scope of the essential character of the present invention, and these shall not be excluded from the scope of the present invention.

As described above, according to the present invention, the interface conversion circuit between the second interface and the first interface, the connector of the first interface, and the memory card device are disposed on the card board, so a composite storage apparatus where a memory card and a storage device with a single interface are supported with a plurality of interfaces can be easily implemented.

What is claimed is:

1. A composite storage apparatus comprising:
   a disk drive which has a first connector for a first interface; and
   a card board having a second connector for the first interface and a third connector for a second interface different in type of interface from the first interface,
   wherein said card board further comprises:
   an interface conversion circuit for converting said second interface into said first interface and being connected to said third connector for connecting to an outside connection using said second interface; and
   a memory card device which is connected to said interface conversion circuit; and
   wherein said second connector is directly connected to a connection line between the interface conversion circuit and the memory card device, for connecting to the outside connection when connecting with the outside connection using the first interface, and for connecting to a disk drive having a first interface when connecting with the outside connection using the second interface.

2. The composite storage apparatus according to claim 1, wherein said memory card device comprises:
   a fourth connector of a memory card; and
   a memory card control circuit which is connected to said fourth connector of said memory card and controls at least one of read and write of said memory card.

3. The composite storage apparatus according to claim 2, wherein the fourth connector of said memory card comprises a plurality of connectors which support different types of memory cards, and
   said memory card control circuit comprises a memory card control circuit for controlling at least one of read and write of said respective different types of memory cards.

4. The composite storage apparatus according to claim 2, further comprising setup means for setting the master/slave between said memory card and said disk drive and disposed in said card board.

5. The composite storage apparatus according to claim 1, further comprising a cable for parallel connecting the second connector of said card board and the first connector of said disk drive to the external in the case of an external connection with said first interface.

6. The composite storage apparatus according to claim 1, further comprising a cable for connecting the second connector of said card board and the first connector of said disk drive in the case of an external connection with said second interface.

7. The composite storage apparatus according to claim 1, wherein said card board mounts said memory card device and said interface conversion circuit on the single side thereof.

8. The composite storage apparatus according to claim 1, wherein said disk drive is comprised of a removable disk drive.

9. The composite storage apparatus according to claim 1, wherein said disk drive comprises:
   a disk drive mechanism; and
   a drive board on which a circuit for controlling said disk drive mechanism is mounted.

10. The composite storage apparatus according to claim 1, wherein said first interface is a parallel interface, and said second interface is a serial interface.

11. The composite storage apparatus according to claim 10, wherein said first interface is an ATA/ATAPI interface, and said second interface is a USB interface.

12. A card board having first and second interfaces, comprising:
    an interface conversion circuit for converting said second interface different in type of interface from said first interface into said first interface;
    a first connector which is connected to said interface conversion circuit and for connecting to an outside connection using said second interface;
    a memory card device which is connected to said interface conversion circuit; and
    a second connector which is directly connected to a connection line between the interface conversion circuit and the memory card device, for connecting to the outside connection when connecting with the outside connection using the first interface, and for connecting to a disk drive having a first interface when connecting with the outside connection using the second interface.

13. The card board according to claim 12, wherein said memory card device further comprises:
    a connector of a memory card; and
    a memory card control circuit which is connected to said connector of said memory card and controls at least one of read and write of said memory card.

14. The card board according to claim 13, wherein the connector of said memory card comprises a plurality of connectors which support different types of memory cards, and said memory card control circuit is a control circuit for controlling at least one of read and write of said respective different types of memory cards.

15. The card board according to claim 12, wherein the second connector of said card board and a connector of a disk drive are connected with a cable in the case of an external connection with said second interface.

16. The card board according to claim 12, wherein external equipment and the second connector of said card board are connected with a cable in the case of an external connection with said first interface.

17. The card board according to claim 12, further comprising setup means for setting the master/slave between said memory card and a disk drive.

18. The card board according to claim 12, wherein said card board mounts said memory card device and said interface conversion circuit on a single face thereof.

19. The card board according to claim 12, wherein said first interface is a parallel interface, and said second interface is a serial interface.

20. The card board according to claim 19, wherein said first interface is an ATA/ATAPI interface, and said second interface is a USB interface.

21. The card board according to claim 12, wherein the second connector of said card board and a connector of a removable disk drive are connected with a cable in the case of an external connection with said second interface.

* * * * *